July 4, 1961
F. B. SELLERS ET AL 2,991,187
METHOD OF AND APPARATUS FOR CONCURRENTLY DISINTEGRATING AND MIXING TOGETHER DIFFERENT SOLID PARTICLES
Filed Dec. 5, 1958
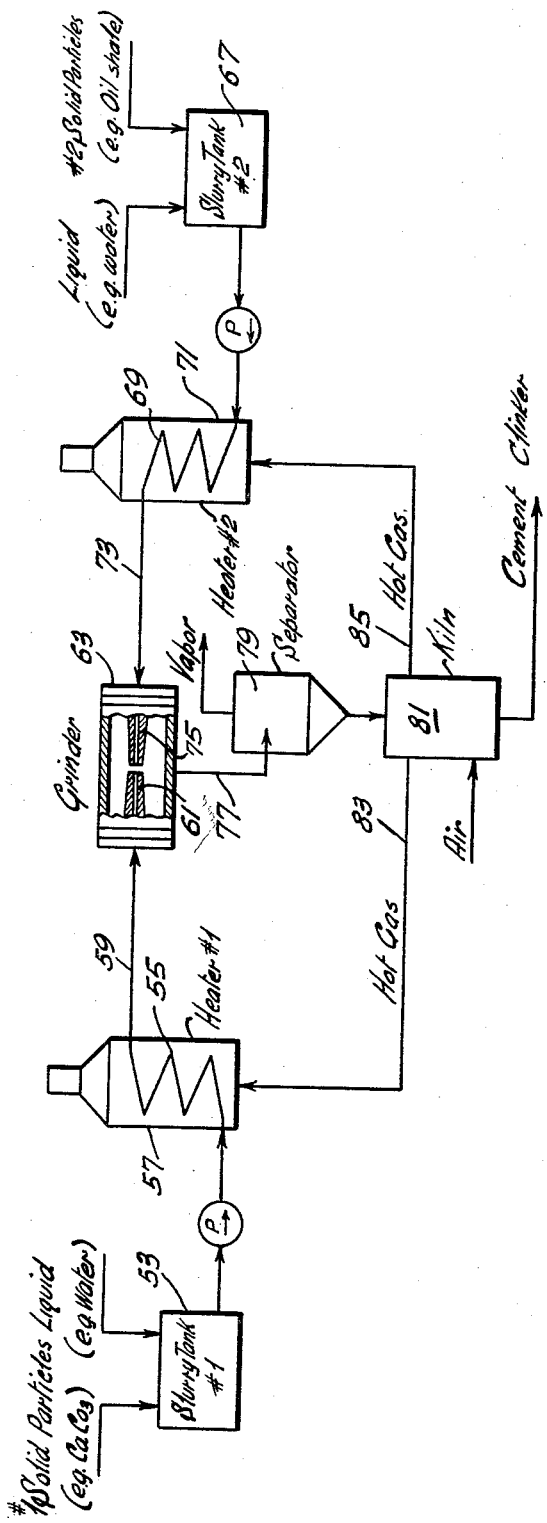

2,991,187
METHOD OF AND APPARATUS FOR CONCURRENTLY DISINTEGRATING AND MIXING TOGETHER DIFFERENT SOLID PARTICLES
Frederick B. Sellers, Tarrytown, and Henry M. Chapin, Dobbs Ferry, N.Y., assignors to Texaco Development Corporation, New York, N.Y., a corporation of Delaware
Filed Dec. 5, 1958, Ser. No. 778,508
10 Claims. (Cl. 106—100)

The present invention relates to a novel method of and apparatus for disintegrating by a fluid energy technique solid particles of different materials, and concurrently forming an intimate mixture of such materials with one another. The invention is also concerned with treating the resulting mixtures to form products such as Portland cement, or metallic iron and other metals.

This application is a continuation-in-part of our application Serial No. 582,799, filed May 4, 1956, and entitled Portland Cement Manufacture From Oil Shale, now Patent 2,904,445, granted September 15, 1959.

In U.S. Patent 2,846,150 there is described a procedure for fluid energy grinding solid particles wherein coarse solid particles are formed into a slurry which is then pumped through a heating coil to evaporate the liquid and form a flowing vaporous dispersion. The flowing dispersion is formed into two streams which are discharged against one another at a large angle, preferably 180°, through a pair of opposed nozzles, thus disintegrating the solid particles to a fine powder.

In accordance with the present invention similar broad principles are followed, but are applied to the formation of a powdered mixture of different solid materials which may then be treated to change the mixture chemically to produce a final product such as sintered cement, reduced iron, or the like. This is accomplished by forming two separate flowable mixtures of coarse particles in vaporizable liquid, passing the mixtures separately and concurrently through first and second separate elongated tubular heating zones (which may be located in either the same or separate heaters or furnaces), heating the mixtures during passage through the tubular heating zones to a temperature above the boiling point of each liquid coming separate flowing streams of dispersions of solid parponent thereby vaporizing the liquid component and forming separate flowing streams of dispersions of solid particles in the resulting vapor. These separate vaporous streams are then discharged against one another at high velocity to disintegrate the coarse particles to fine particles and to effect intimate mixture of fine particles of the different materials with one another. Subsequently the mixture can be passed to a sintering zone, or to a reducing zone, or may be formed into briquets for any desired purpose.

The invention will be described more in detail in connection with the single figure of the drawing, which is a schematic flow diagram of one arrangement of apparatus for performing the invention.

In describing the operation the production of Portland cement from a mixture of oil shale (an argillaceous material) and calcium carbonate (a calcareous material) will be described purely to exemplify the principles of the invention. However, these principles also may be applied to other solids, such as mixtures of clay and limestone; or mixtures of a carbonaceous solid such as coal or coke with an oxidic ore, such as iron ore; or to the production of mixtures of paint pigments with one another.

Referring to the drawing, coarse limestone particles are mixed with water in a tank 53 and passed through a heating coil 55 arranged within a heater 57 to vaporize the water and form a flowing dispersion of solid particles in steam, which is then passed through a conduit 59 to a nozzle 61 in a grinding chamber 63. Concurrently, coarse oil shale particles are mixed with water in a tank 67 and passed through a heater coil 69 within a heater 71 to form a steam dispersion which flows through a conduit 73 to a nozzle 75 arranged within the grinding chamber 63 diametrically opposed to the nozzle 61. The resulting two jets of dispersions flow at high velocity and turbulently against one another at an angle of 180° to disintegrate the oil shale and limestone particles, which then mix intimately together within the grinder chamber 63 and pass through a conduit 77 to a cyclone separator 79. Steam leaves the top of the separator while hot dry intimately mixed solid particles leave the bottom and are charged to a shaft kiln 81.

As the mixture passes through shaft kiln 81 air is blown in and the combustible content of the oil shale is burned to form heat to sinter the solid argillaceous oil shale residue with the limestone particles and form a Portland cement clinker which is withdrawn at the bottom of the kiln. Supplemental heat may also be supplied by an oil or gas flame when the combustible content of the oil shale is not adequate for the complete sintering operation.

Hot gases in excess of 1000° F. pass from kiln 81 through two conduits 83 and 85 to the respective heaters 57 and 71 wherein they heat the slurries and dispersions, with or without augmentation by other heating means.

The requirements as to slurry proportions, usable slurry liquids, stream velocity, temperatures, pressures and other conditions will generally be the same as outlined in Patent 2,846,150, as well as in the parent of the present application.

The foregoing description has involved the grinding and mixing of only two different ingredients from separate sources. Our invention, however, also relates to the grinding and mixing of more than two ingredients. For example, we can initially form one slurry with one or more solid ingredients, and a second slurry with one or more ingredients, as may be the case when grinding and mixing iron ore from one slurry with coke and limestone from a second slurry. Obviously numerous other combinations can be employed using the principles of this invention.

*Example I*

A slurry consisting of 50% by weight of water and 50% by weight of crushed oil shale (60 weight percent ash and 40 weight percent combustible organic material) is made-up in tank 67 and passed at 700 p.s.i.g. into 400 feet of coiled ½ inch extra heavy steel pipe 69 at a rate of 800 pounds per hour. During its passage through pipe 69 the slurry is heated to a maximum temperature of 700° F. and its water content is vaporized so as to form a flowing dispersion of oil shale particles in steam. The dispersion is then passed to a nozzle 75 having a 5/32 inch orifice.

Meanwhile, a second 1:1 by weight water slurry of crushed limestone is made-up in tank 53. The limestone slurry is passed at a rate of 1440 lbs. per hour through a second heater coil 55 wherein it is heated to a maximum temperature of 700° F., to vaporize the water and form a steam dispersion which flows to a nozzle 61 having a 5/32 inch orifice.

The two streams of dispersion collide at 180°, and the particles are so reduced in size that 98% pass through a 325 mesh sieve.

The resulting intimate mixture of oil shale and limestone particles, together with low pressure steam, then flows to cyclone separator 79, from which steam passes off the top and the cement premix is discharged from the bottom into a shaft kiln 81 for sintering.

Clinker having the following nominal analysis is continuously discharged from the shaft kiln at a rate of 650 lbs. per hour:

| Oxide: | Weight percent |
|---|---|
| $SiO_2$ | 22.3 |
| $Al_2O_3$ | 6.2 |
| $Fe_2O_3$ | 2.2 |
| $CaO$ | 67.3 |
| $MgO$ | 2.0 |

The metals, of course, are not necessarily present as the oxides, but usually exist in complex compounds such as silicates.

*Example II*

A slurry consisting of 50% by weight of water and 50% by weight of magnetite-rich iron ore is pumped continuously from tank 53 at 700 p.s.i.g. into 400 feet of coiled ½ inch extra heavy steel pipe 55 at a rate of 800 pounds per hour wherein it is heated to 700° F. and a flowing steam dispersion is formed.

In the second tank 67 there is formed a slurry of 50% by weight of water, and 50% by weight of a mixture of coarse coke particles and coarse limestone particles in a ratio of 2:1 by weight. This second slurry is also pumped at 700 p.s.i.g. into a similar coil 69 at a rate of 800 pounds per hour and is heated to a maximum temperature of 700° F. to form a flowing steam dispersion.

The two dispersions are separately passed to the nozzles 61 and 75 and are discharged against one another at 180° to disintegrate all the particles and form an intimate mixture with one another. The steam is then separated from the resulting powdered mixture in the cyclone 79 and the mixture of iron ore, limestone, and coke powders in dry form is removed at the bottom, for subsequent charging to an ore reduction furnace such as a blast furnace.

Our novel invention as described in detail above provides the following important advantages over the prior art:

(1) Avoids stratification in the slurry tank which may occur when two solids of markedly different specific gravities are mixed in a slurry.

(2) Two different solids having differing solubilities can be ground, whereas mixing the two solids together in a single liquid such as water might result in the dissolving of one of them. For example, two solids which are soluble only in water and alcohol, respectively, can be mixed in alcohol and water, respectively, and discharged against one another as separate jets.

(3) Two solids which will react with one another when mixed in a single slurry liquid may be ground and then mixed by this separate type of operation.

(4) Where solids are such that different proportions in the slurry liquid are necessary or desirable, the separate operation can be employed to assure these proportions, thus avoiding the excess cost of heating more liquid than is necessary for one of the solid ingredients.

Obviously, many modifications and variations of the invention, as hereinbefore set forth, may be made without departing from the spirit and scope thereof, and therefore only such limitations should be imposed as are indicated in the appended claims.

We claim:

1. A method for concurrently distintegrating and mixing together at least two different solid materials in powdered form comprising forming a first flowable mixture of coarse particles of one of said materials in vaporizable liquid; forming a second and separate flowable mixture of coarse particles comprising a second and different one of said materials in vaporizable liquid; passing said mixtures separately and concurrently through first and second separate elongated tubular heating zones; heating said mixtures during passage through said tubular heating zones to a temperature above the boiling point of each liquid component, thereby vaporizing the liquid component and forming separate flowing streams of dispersions of solid particles in the resulting vapor; and discharging said separate streams against one another at high velocity to disintegrate coarse particles to fine particles and to effect intimate mixture of said fine particles with one another.

2. A method in accordance with claim 1 also comprising the step of separating the vapor from said mixture of fine particles.

3. A method in accordance with claim 1 wherein one of said flowable mixtures comprises coarse particles of oil shale in vaporizable liquid, and the other of said flowable mixtures comprises coarse particles of calcareous material in a vaporizable liquid; said method also comprising the steps of passing the resulting mixture of fine particles to a third heating zone; firing said mixture of fine particles and sintering said particles at least partially by the heat of combustion of the organic material in said oil shale; and discharging the resulting cement slinker from said third heating zone.

4. A method in accordance with claim 1 wherein one of said flowable mixtures comprises coarse particles of a metal oxide in a vaporizable liquid, and wherein the other of said flowable mixtures comprises coarse particles of carbonaceous material in a vaporizable liquid; said method also comprising passing the resulting mixture of fine particles to a third heating zone; firing said particles of carbonaceous material in said mixture and reducing said metal oxide to the corresponding metal; and recovering said metal from said third heating zone.

5. A method in accordance with claim 4 wherein one of said separate flowable mixtures also contains coarse particles of a mineral material characterized by the ability to form a fluxing slag in said third heating zone.

6. Apparatus for concurrently disintegrating and mixing together different solid particles in powdered form comprising, in combination, means providing first and second separate elongated tubular heating zones; first and second separate containers for flowable mixtures of solid particles in vaporizable liquid; separate means connecting said first container to said first heating zone and said second container to said second heating zone for passing to said heating zones two separate streams of flowable mixtures comprising coarse solid particles in vaporizable liquid; means for heating said flowable mixtures in said heating zones to a temperature sufficient to vaporize said liquid from each mixture; a grinding chamber; a pair of opposed nozzles in said grinding chamber for discharging separate streams of vaporous dispersions of said solid particles against one another; and passage means severally connecting said nozzles to said separate elongated tubular heating zones, whereby jets of said dispersions impinge against one another at high velocity in said grinding chamber to disintegrate said coarse particles and form an intimate mixture thereof with one another in powdered form.

7. Apparatus in accordance with claim 6, also comprising means connected to said grinding chamber for separating vapor from said powdered mixture.

8. Apparatus in accordance with claim 6, also comprising means connected to said grinding chamber for receiving said powdered mixture therefrom and heating said mixture to change said mixture chemically.

9. Apparatus in accordance with claim 8 wherein said last named means is a kiln for sintering cement ingredients to produce a cement clinker product.

10. Apparatus in accordance with claim 8 wherein said last named means is a furnace for conducting a reducing reaction between a metal oxide and carbonaceous material to produce the corresponding metal as product.

References Cited in the file of this patent

UNITED STATES PATENTS

| | | |
|---|---|---|
| 2,592,468 | Rex | Apr. 8, 1952 |
| 2,704,635 | Trost | Mar. 22, 1955 |
| 2,735,787 | Eastman et al. | Feb. 21, 1956 |
| 2,846,150 | Work | Aug. 5, 1958 |